United States Patent [19]

Joslyn et al.

[11] 3,708,441

[45] Jan. 2, 1973

[54] PROCESS FOR MAKING PVC FOAMS

[75] Inventors: Wallace G. Joslyn, Joseph W. Keil, both of Midland, Mich.

[73] Assignee: Dow Corning Corporation, Midland, Mich.

[22] Filed: Oct. 19, 1970

[21] Appl. No.: 82,031

[52] U.S. Cl......260/2.5 P, 260/31.4 R, 260/31.4 EP, 260/31.8 E, 260/31.8 M, 260/31.8 XA, 260/836, 260/859, 260/862, 260/884, 260/899

[51] Int. Cl................................................C08j 1/16
[58] Field of Search ...................................260/2.5 P

[56] References Cited

UNITED STATES PATENTS

| | | | |
|---|---|---|---|
| 3,066,110 | 11/1962 | Cornell | 260/2.5 P |
| 3,338,846 | 8/1967 | Klopfer | 260/2.5 P |
| 3,399,107 | 8/1968 | Bishop et al. | 260/2.5 P |
| 3,383,337 | 5/1968 | Garling et al. | 260/2.5 P |

Primary Examiner—Murray Tillman
Assistant Examiner—Morton Foelak
Attorney—Robert F. Fleming, Jr., Laurence R. Hobey, Howard W. Hermann, Harry D. Dingman and Jack E. Moermond

[57] ABSTRACT

An improved process for making plastisol foams is disclosed, the improvement comprising adding to the plastisol composition, prior to foaming, a material which is compatible with the plastisol and which cures at about room temperature, then foaming the resulting mixture, then curing the material added at about room temperature, and finally fusing the plastisol foam. Optionally, the foam can be shaped before or after the material is cured, but prior to fusing the plastisol composition. A separable aspect of the invention is the application of a vacuum after the composition has been foamed and prior to curing of the material, and optionally releasing the vacuum after the material has cured but prior to fusing the plastisol foam whereby a low density foam is obtained.

16 Claims, 1 Drawing Figure

\* Separable aspect of invention

\*\* Optional

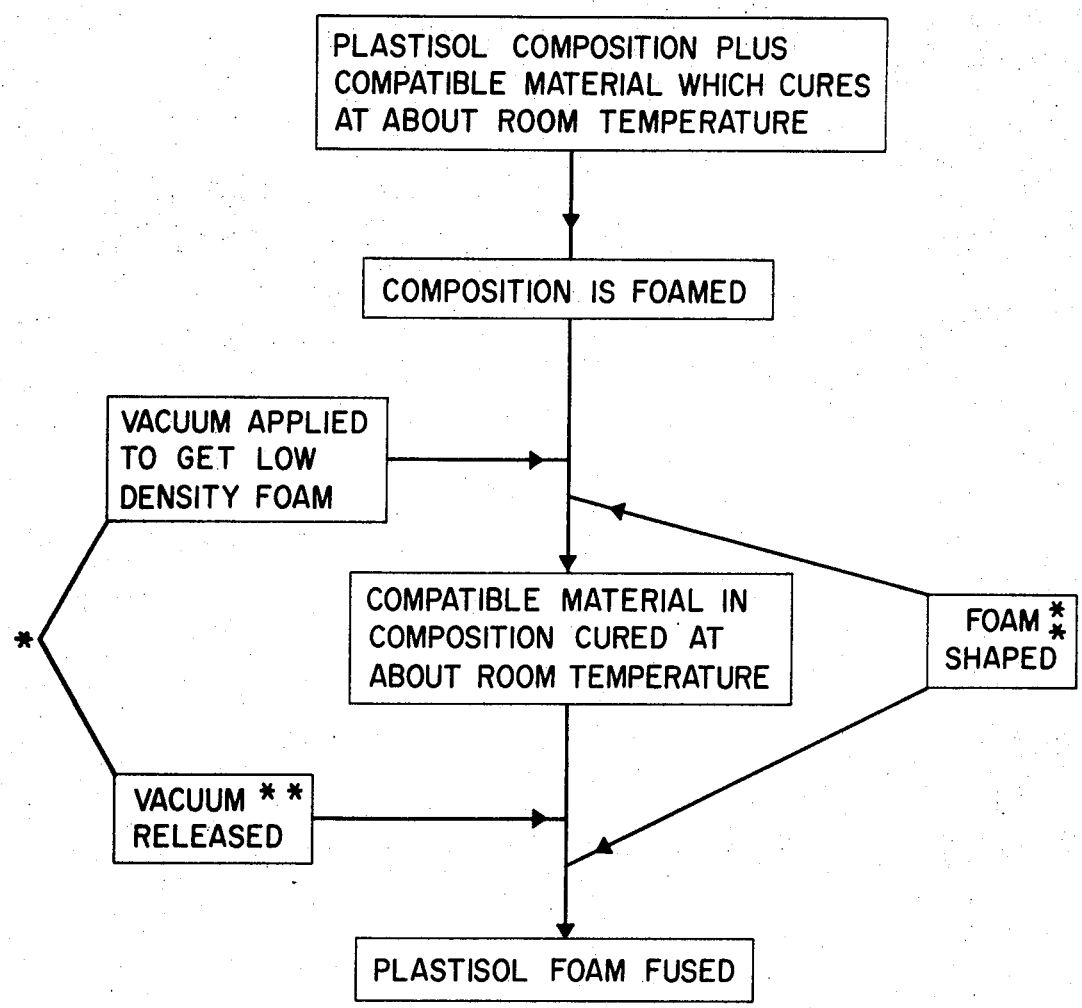
\* Separable aspect of invention
\*\* Optional
INVENTORS
WALLACE G. JOSLYN
JOSEPH W. KEIL
BY Jack E. Moermond
AGENT

PROCESS FOR MAKING PVC FOAMS

Plastisols are well known compositions. They are simply mixtures of a particulate thermoplastic vinyl resin, such as polyvinyl chloride or a resinous copolymer of a major portion of vinyl chloride and a minor portion of a copolymerizable monomer such as vinyl acetate, and a high boiling organic liquid plasticizer which is substantially a non-solvent for the particulate resin at ordinary temperatures but is capable of dissolving the resin at elevated temperatures to form a single phase material which upon cooling to ordinary temperatures is a solid material having good physical properties, For those who require more detailed information on plastisols reference is made to the article "Plastisols and Organosols" by E.G. Partridge et al. in *Rubber Age*, volume 67, pages 553–560 (August 1950); the article "Compounding Plastisols for Specific Applications" by Clark et al. in *Rubber Age*, volume 72, pages 343–349 (December 1952); and pages 170–186 of the book "*The Technology of Solvents and Plasticizers*" by A. K. Doolittle, published in 1954 by Wiley.

The present invention is applicable to any of the ordinary plastisols and the term "plastisol" as used herein is intended to include "modified plastisols" i.e., plastisols containing up to 10 percent by weight of an organic thinner or diluent such as naphtha, this percentage being based on the sum of the resin and the plasticizer in admixture therewith.

The plastisol will usually consist of the particulate vinyl resin and from 50 to 150 parts by weight (per 100 parts by weight of resin) of high boiling organic liquid plasticizer, together with small amounts of conventional additives such as stabilizers, pigments, etc. Specific examples of suitable plasticizers, stabilizers, pigments, etc. are disclosed in the articles and book incorporated by reference above, and numerous other places in the literature, and hence no useful purpose would be served by listing them again here.

Plastisol foams find many uses. For example, plastisol foams can be used for carpet backing, decorative and garment textile backings, paper and plastic backings, cushioning and padding in furniture, bedding and transportation seating, automobile crash padding, gaskets, filters, shock mountings, cleaning sponges, toys, wall coverings, insulation and laminated structures.

Plastisol foams are made by expanding the plastisol composition with a gas. The particular method by which expansion is accomplished depends on the available equipment and individual preferences. the numerous ways in which gas is incorporated into plastisols to foam them are well known in the art. These ways include, for example, the chemicals which release a gas under the desired conditions and called blowing agents in the art; bubbling a gas into the plastisol; and mechanically beating air or another gas into the plastisol. Of these techniques, the mechanical beating or whipping of a gas into the plastisol is frequently preferred. Of course, combinations of these methods can also be employed. While any gas which produces no undesirable effects on the resulting product can be employed to expand the plastisol, air is an obvious preference because of its ready availability and cheapness. Once the plastisol has been foamed it can be formed into the desired shape by any well known means such as extruding or molding.

In the preparation of plastisol foams it is common practice to incorporate a foam stabilizer in the composition. Illustrative of such foam stabilizers are the alkali metal soaps, blends of alkali metal soaps and amine soaps, and the siloxane resins which are described in detail in U.S. Pat. Nos. 3,288,729, 3,301,798 and 3,511,788 respectively. These foam stabilizers are commercially available. The siloxane resin foam stabilizers are preferred because they also impart water resistance to the foam which is important in making baby mattresses, boat cushions, life jackets, and in other similar applications.

In the manufacture of articles from plastisol foams, which articles have a thickness of greater than one inch, difficulty has been encountered in that the thicker sections tend to collapse resulting in poor products. This has caused many manufacturers to use other materials such as polyurethanes when thick articles are involved even though plastisol foams generally have better weatherability and are non-flammable, or more easily made so, than the polyurethane foams.

It is an object of this invention to provide an improved method of making plastisol foams.

Another object is to provide an improved process for making plastisol foams whereby articles having a thickness of greater than one inch can be prepared.

Still another object is to provide an improved process for making plastisol foams which allows the use of larger amounts of extender grade polyvinyl chloride and lesser amounts of dispersion grade polyvinyl chloride than heretofore possible.

Yet another object of this invention is to provide a process whereby low density plastisol foams can be prepared when the gas is mechanically incorporated into the foam.

Other objects and advantages of this invention will be obvious to those skilled in the art from the disclosure and examples.

The drawing is a crude self-explanatory, flow diagram which has been presented to assist those skilled in the art to better understand the essentials in the process of this invention.

It has now been found that when one adds a material to the plastisol prior to foaming which material is compatible with the plastisol and which cures at about room temperature, then foams the resulting mixture, then cures the material added at about room temperature, and finally fuses the plastisol foam, that it is possible to prepare articles from the plastisol foam in thicknesses greater than one inch without the foam collapsing.

It has also been unexpectedly found that the addition of the material to the plastisol permits the use of larger quantities of extender grade polyvinyl chloride and less quantities of dispersion grade polyvinyl chloride in the plastisol than possible prior to this invention.

The material added to the plastisol to achieve the above results can be, by way of illustration, vinylic monomers such as acrylates, methacrylates and unsaturated polyesters; epoxy resins and polyurethanes. The term "vinylic monomers" as used herein includes the monomers per se, low molecular weight polymers, and mixtures of such monomers and polymers, so long as the visocity of the material is not so high as to give handling problems. Specific examples of suitable materials include methyl acrylate, ethyl acrylate, butyl acrylate, isobutyl acrylate, 2-ethylhexyl acrylate, methyl methacrylate, ethyl methacrylate, butyl methacrylate, isobutyl methacrylate, isodecyl methacrylate, lauryl methacrylate, stearyl methacrylate, hydroxyethyl methacrylate, hydroxypropyl methacrylate, acrylic acid, methacrylic acid, methacrylamide, dimethylaminoethyl methacrylate and t-butylaminoethyl acrylate.

As noted above, the material added must be "compatible" with the plastisol. By this it is meant that the material is at least partially soluble and/or dispersible in the plastisol. Of course, the material can be completely soluble or dispersible in the plastisol too. It is believed that the best results can be obtained when the material is completely soluble in the plastisol.

An additional limitation on the material employed is that it must cure at about room temperature. However, the materials illustrated above are shown numerous places in the art to be curable at room temperature. Thus while this is an important limitation in defining the operable materials it poses no problems to those skilled in the art as these materials are well known with many of them being commercially available.

At least 1.25 parts by weight of the material per 100 parts by weight of the remainder of the plastisol composition must be used in order to realize the advantages of this invention. Generally speaking, however, it is preferable to use an amount in the range of 3 to 5 parts. While amounts ranging up to 10 parts or more can be used, usually there is no advantage or reason for doing so.

In the practice of this invention the material is added to the plastisol composition prior to foaming except that the catalyst or last component needed to cause the material to gel is withheld. The composition is then foamed after which the catalyst or final component needed to cause the material to gel is added and mixed in and then the material allowed to gel at about room temperature.

It should be obvious that when vinylic materials such as acrylates, methacrylates and the polyesters are employed, that the process should be carried out in an inert atmosphere as nitrogen. While an inert atmosphere does not need to be employed when the material is a polyurethane or an epoxy resin, no harm results from using one.

Thus, other than the above considerations, there is no criticality as to the manner or time of addition other than the obvious ones attendant any commercial process. That is to say, the material can be added to the plastisol composition in any manner over any length of time consistent with the available equipment and process currently being employed.

After all components have been added and mixed the foam is simply allowed to stand at about room temperature whereupon the material gels or cures. This step is essential and is believed to prevent the foam from collapsing before the final step of fusing the plastisol foam. As a matter of fact, one of the advantages of this invention resides in the fact, that after the material added is gelled the composition can be stored indefinitely if so desired before the plastisol foam is fused. This was not possible heretofore. Experiments have shown that compositions made in accordance with this invention wherein the composition has been foamed and the material gelled can be stored over a year before the plastisol foam is fused and still obtain a good usable plastisol foam product.

Between the foaming of the composition and the final fusing of the plastisol foam, the foam is shaped to take the desired configuration. Thus, shaping may be done before or after curing of the material. The actual point at which shaping is done will depend on the kind of article made and the equipment being used, but generally will be done prior to the curing of the material. Obviously it is also possible to shape the foam after the plastisol has been fused, as for example, by cutting it into the desired shape.

After the composition has been foamed it has been found possible to apply a vacuum to the foam to obtain a low density product. The vacuum can be released either after the material has cured at room temperature or after the plastisol foam has been fused. Heretofore whenever attempts were made to prepare low density plastisol foams, excessive drainage was usually encountered before the plastisol foam could be fused.

Now in order that those skilled in the art may better understand how the present invention can be practiced, the following examples are given by way of illustration and not by way of limitation. All percents referred to herein are on a weight basis and all viscosities measured at 25° C. unless otherwise specified.

EXAMPLE 1

To a mixer bowl there was added 100 g. of butyl benzyl phthalate, 100 g. of polyvinyl chloride resin (Cary P-1716, a dispersion grade homopolymer), 6 g. of a plastisol foam stabilizer of the type disclosed in U.S. Pat. No. 3,511,788, and 30 drops of stannous octoate in 5 g. of butyl benzyl phthalate.

The foam stabilizer was prepared by refluxing a mixture of 71.0 g. of a polyoxypropylene triol of 2,700 molecular weight, 45.4 g. xylene, 7.0 drops of potassium hydroxide solution and 66.6 g. of a 75 percent solution in xylene of a resin copolymer composed of $(CH_3)_3SiO_{1/2}$ and $SiO_2$ units in the range of 1:0.6 to 1:1.2. The mixture was refluxed for 2 hours to 156° C. removing 0.5 ml. of water in the azeotrope. The product is a polyol modified resin copolymer which functions not only as a foam stabilizer for the plastisol foam but also as a source of hydroxyl radicals for the polyurethane gelling material.

The composition in the mixer bowl was mechanically whipped with a Hobart Kitchen-Aid Mixer at a moderate speed for 10 minutes to obtain maximum foam. Then 1.5 g. of polymethylene polyphenylisocyanate (PAPI, a commercially available polyisocyanate containing 31 percent isocyanate functionality) was added to the foam and whipping continued for 15 minutes at low speed. The foam was allowed to stand at room temperature and upon checking about 24 hours later the polyurethane was found to have gelled, preventing the collapse of the plastisol foam prior to fusing. Without the addition of the polyurethane gelling material a plastisol foam prepared as above would normally coalesce and collapse after about 3 hours.

EXAMPLE 2

To a mixer bowl there was added 100 g. of dioctyl phthalate, 100 g. of polyvinyl chloride resin (Cary P-1716), 27 g. of a polyoxypropylene triol of 2,700 molecular weight, 12 g. of a liquid diisocyante having an average viscosity of 30 cps. and an NCO equivalent of 144 (Isonate 143-L) and 6 g. of a plastisol foam stabilizer which is a 50 percent xylene solution of a resin copolymer composed of $(CH_3)_3SiO_{1/2}$ and $SiO_2$ units in the range of 1:0.6 to 1:1.2.

The above composition was mechanically whipped on a Hobart Kitchen-Aid Mixer until maximum foam was obtained and then about 1 g. of dibutyltin diacetate was added and mixed in. Upon standing at room temperature the polyurethane material gelled in about 4 minutes. After 24 hours the polyurethane was highly extended and slightly elastic and cheesy.

A piece of the above prepared composition was fused for 20 minutes at 300° F. The resulting plastisol foam had small cells and was cheesy.

EXAMPLE 3

To a mixer bowl there was added 372 g. of dioctyl phthalate, 37.2 g. of trimethylolpropane trimethacrylate, 14.8 g. of a commercial polyvinyl chloride resin stabilizer (Advastab ABC-7), 22.2 g. of the plastisol foam stabilizer of Example 2, 3.7 g. of benzoyl peroxide, 16 g. of tridecanol (a viscosity depressant) and 372 g. of polyvinyl chloride resin (Tenneco 1755, a dispersion grade homopolymer).

The above composition was mechanically whipped on a Hobart Kitchen-Aid Mixer under a nitrogen atmosphere in a dry box for 15 minutes at a moderate speed to obtain a foam. Then 7.46 g. of N,N-dimethyl-p-toluidine (activator for the benzoyl peroxide) was added and whipping continued 30 seconds at moderate speed followed by 1 minute at slow speed. The composition was then shaped by placing in an aluminum box, striking off the excess, and placing a lid on the box. Upon standing at room temperature for about 5 to 7 minutes the methacrylate material gelled. This box was placed in a heated press and the plastisol foam fused at 340° F. for about 60 minutes. A very good plastisol foam block having small cells was obtained.

EXAMPLE 4

To a mixer bowl there was added 400 g. of dioctyl phthalate, 32 g. of the plastisol foam stabilizer of Example 2, 400 g. of polyvinyl chloride resin (Tenneco 1755) and 20 g. of the cycloaliphatic resin

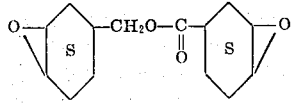

The above composition was mechanically whipped on a Hobart Kitchen-Aid Mixer to obtain maximum foam and then 13 g. of trimethoxy boroxime was added as a 75 percent solution in dioctyl phthalate and whipped into the composition. Upon standing for 30 seconds at room temperature the epoxy resin had gelled. This composition was shaped by placing in an 8 X 8 X 2 inches silicone-laminate box and then the plastisol foam was fused by placing the box in a 3 kv. dielectric oven at a 1-½ inches plate height for 85 seconds with a peak draw of 840 milliamps. The resulting polyvinylchloride foam was snowwhite in color and had a fine-cell size.

EXAMPLE 5

To a mixer bowl there was added 50 g. of butyl benzyl phthalate, 50 g. of polyvinyl chloride resin (Cary P-1716), 4 g. of a plastisol foam stabilizer of the type used in Example 1 except that a 4,100 molecular weight polyoxypropylene triol was used in making this material, 20 drops of methyl ethyl ketone peroxide and 15 g. of a polyester resin (Derakane 114, a vinyl ester resin in 40 percent styrene containing 0.5 percent cobalt naphthenate and having the general structure

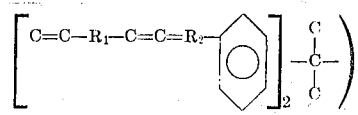

The above composition was mechanically whipped on a Hobart Kitchen-Aid Mixer under a nitrogen atmosphere in a dry box to obtain maximum foam and then 0.5 g. of N,N-dimethyl-p-toluidine was added and whipping continued to mix it into the foam. Upon standing at about room temperature for 1 hour and 20 minutes the polyester resin gelled. The plastisol foam was then fused for 40 minutes at 300° F. to obtain a small-celled brown foam which had good properties when compared to a standard foam made without the polyester resin employed here.

EXAMPLE 6

To a mixer bowl there was added 100 g. of butyl benzyl phthalate, 100 g. of polyvinyl chloride resin (Cary P-1716), 8 g. of the plastisol foam stabilizer of Example 5, 10 g. of 1,3-butylene dimethacrylate and 0.5 g. of benzoyl peroxide.

The above composition was mechanically whipped or frothed on a Hobart Kitchen-Aid Mixer under a nitrogen atmosphere in a dry box for 15 minutes at a moderate speed to obtain maximum foam. Then about 1 g. of N,N-dimethyl-p-toluidine was added and whipping continued for 1 minute at moderate speed followed by whipping at slow speed until gellation of the methacrylate began. An additional 3 minutes of standing at room temperature was required for gellation to be completed. The plastisol foam was then fused for 20 minutes at 300° F. A good plastisol foam with small cells was obtained.

EXAMPLE 7

To a mixer bowl there was added 50 g. of dioctyl phthalate, 50 g. of polyvinyl chloride resin (Cary P-1716), 40 g. of methyl methacrylate, 0.5 g. of benzoyl peroxide and 4 g. of the plastisol foam stabilizer of Example 2.

The above composition was mechanically whipped on a Hobart Kitchen-Aid Mixer under a nitrogen atmosphere in a dry box to obtain maximum foam and then about 1 g. of N,N-dimethyl-p-toluidine added. Whipping was continued to mix in this component and then the composition allowed to stand at about room temperature for about 20 minutes after which time the methacrylate had formed a loose gel. The plastisol foam was then fused for 15 minutes at 300° F. The product was a good plastisol foam which was tough and had small cells.

EXAMPLE 8

To a one-half ounce vial there was added 5 g. of dioctyl phthalate, 5 g. of polyvinyl chloride resin (Cary P-1716), 0.05 g. of benzoyl peroxide, 2 g. of ethyl acrylate and 2 drops of N,N-dimethyl-p-toluidine. The ethyl acrylate formed a tight gel upon standing for 13 minutes and the composition exothermed to 55° C. the plastisol was fused for about 15 minutes at 300° F. to obtain a tough, elastomeric product. Since the acrylate gels the plastisol, based on the prior examples it is obvious it would also gel the plastisol if it were foamed.

EXAMPLE 9

To a mixer bowl there was added 250 g. of polyvinyl chloride resin (Cary P-1716), 170 g. of butyl benzyl phthalate, 20 g. trimethylolpropane trimethacrylate, 12 g. of the plastisol foam stabilizer of Example 5, 2 g. of benzoyl peroxide and 9 g. of polyvinyl chloride resin stabilizer (Advastab ABC-7).

The above composition was mechanically whipped on a Hobart Kitchen-Aid Mixer under a nitrogen atmosphere in a dry box to obtain maximum foam and then about 2 g. of N,N-dimethyl-p-toluidine added and mixed into the foam. A vacuum was then pulled on the foam and after standing at room temperature for 5 minutes the methacrylate had gelled. The vacuum was then released and the plastisol foam fused for 50 minutes at 300° F. The product was a good polyvinyl chloride foam having small cells and a density of 10.4 pounds per cubic foot. A foam made by the above process but without the use of vacuum would normally have a density in the range of 25 to 27 pounds per cubic foot. So far as is known, heretofore, it has not been possible to prepare such low density plastisol foams using mechanical frothing of the plastisol which can be subsequently fused without having excessive drainage.

EXAMPLE 10

To a mixer bowl there was added 100 g. of polyvinyl chloride resin (Cary P-1716), 90 g. of butyl benzyl phthalate, 1 g. of benzoyl peroxide, 6 g. of the plastisol foam stabilizer of Example 5, 10 g. of trimethylolpropane trimethacrylate and 3 g. of a polyvinyl chloride resin stabilizer (Advastab ABC-7).

The above composition was mechanically whipped on a Hobart Kitchen-Aid mixer under a nitrogen atmosphere in a dry box to obtain maximum foam. Then about 1 g. of N,N-dimethyl-p-toluidine was added and mixed into the foam after which the foamed composition was poured into a cylindrical silicone rubber mold 4 inches in diameter and 6 inches in height. Upon standing at room temperature for 2-½ minutes the methacrylate had gelled. The plastisol foam was then fused in the mold for 2 hours at 300° F. A very good thick section cylinder of polyvinyl chloride foam was obtained which had small cells and a density of 37 pounds per cubic foot.

That which is claimed is:

1. In a process for preparing a plastisol foam, said plastisol being a mixture of a particular thermoplastic vinyl resin or a resinous copolymer of a major portion of such a resin and a minor portion of a copolymerizable monomer, and a high boiling organic liquid plasticizer which is substantially a non-solvent for the particulate resin at ordinary temperatures but is capable of dissolving the resin at elevated temperature to form a single phase material which upon cooling to ordinary temperature is a solid material, the improvement comprising adding to the plastisol composition, prior to foaming, a material which is compatible with the plastisol and cures at about room temperature, said material being selected from the group consisting of vinylic monomers selected from the group consisting of acrylates, methacrylates and unsaturated polyesters; epoxy resins; and polyurethanes, then foaming the resulting mixture, then curing the material added at about room temperature using a curing agent, and finally fusing the plastisol foam.

2. A process as defined in claim 1, wherein a plastisol foam stabilizer is employed in the plastisol composition.

3. A process as defined in claim 1 wherein the material added to the plastisol composition is a methacrylate monomer.

4. A process as defined in claim 3, wherein the methacrylate monomer is trimethylolpropane trimethacrylate.

5. A process as defined in claim 3, wherein the methacrylate monomer is 1,3-butylene dimethacrylate.

6. A process as defined in claim 2 wherein the material added to the plastisol composition in a methacrylate monomer.

7. A process as defined in claim 6, wherein the methacrylate monomer is trimethylolpropane trimethacrylate.

8. A process as defined in claim 6, wherein the methacrylate monomer is 1,3-butylene dimethacrylate.

9. A process as defined in claim 1, which includes the step of shaping the foam after it is formed but prior to fusing.

10. a process as defined in claim 9 wherein the foam is shaped into articles having thicknesses greater than 1 inch.

11. A process as defined in claim 2, which includes the step of shaping the foam after it is formed but prior to fusing.

12. a process as defined in claim 11, wherein the foam is shaped into articles having thicknesses greater than one inch.

13. A process as defined in claim 1, which includes the step of applying a vacuum to the foam after it has been formed but prior to the curing of the material, whereby a plastisol foam having a density of less than 20 pounds per cubic foot is obtained.

14. A process as defined in claim 2, which includes the step of applying a vacuum to the foam after it has been formed but prior to the curing of the material, whereby a plastisol foam having a density of less than 20 pounds per cubic foot is obtained.

15. A process as defined in claim 9, which includes the step of applying a vacuum to the foam after it has been formed but prior to the curing of the material, whereby a plastisol foam having a density of less than 20 pounds per cubic foot is obtained.

16. A process as defined in claim 11, which includes the step of applying a vacuum to the foam after it has been formed but prior to the curing of the material, whereby a plastisol foam having a density of less than 20 pounds per cubic foot is obtained.

* * * * *